(12) United States Patent
Chen et al.

(10) Patent No.: US 11,345,609 B2
(45) Date of Patent: May 31, 2022

(54) HIGH VOLTAGE LITHIUM NICKEL COBALT MANGANESE OXIDE PRECURSOR, METHOD FOR MAKING THE SAME, AND HIGH VOLTAGE LITHIUM NICKEL COBALT MANGANESE OXIDE CATHODE MATERIAL

(71) Applicant: BASF SHANSHAN BATTERY MATERIALS CO., LTD., Changsha (CN)

(72) Inventors: Jiuhua Chen, Changsha (CN); Min Huang, Changsha (CN); Wei Peng, Changsha (CN); Xinxin Tan, Changsha (CN); Xu Li, Changsha (CN); Hui Shi, Changsha (CN)

(73) Assignee: BASF SHANSHAN BATTERY MATERIALS CO., LTD., Changsha (CN)

( * ) Notice: Subject to any disclaimer, the term of this patent is extended or adjusted under 35 U.S.C. 154(b) by 148 days.

(21) Appl. No.: 16/638,630

(22) PCT Filed: Apr. 26, 2018

(86) PCT No.: PCT/CN2018/084678
§ 371 (c)(1),
(2) Date: Feb. 12, 2020

(87) PCT Pub. No.: WO2019/037459
PCT Pub. Date: Feb. 28, 2019

(65) Prior Publication Data
US 2021/0130189 A1 May 6, 2021

(30) Foreign Application Priority Data
Aug. 25, 2017 (CN) .......................... 201710743672.5

(51) Int. Cl.
*C01G 53/04* (2006.01)

(52) U.S. Cl.
CPC .......... *C01G 53/04* (2013.01); *C01P 2004/61* (2013.01)

(58) Field of Classification Search
CPC ...... C01G 53/04; C01G 53/006; C01G 53/50; C01G 53/44; C01P 2004/61;
(Continued)

(56) References Cited

U.S. PATENT DOCUMENTS

2018/0026267 A1* 1/2018 Kim .................. H01M 4/525
429/223
2021/0202939 A1 7/2021 Li et al.

FOREIGN PATENT DOCUMENTS

| CN | 104201367 A | 12/2014 |
| CN | 104979546 A | 10/2015 |

(Continued)

OTHER PUBLICATIONS

English machine translation of JP2016138024A (Year: 2016).*
(Continued)

*Primary Examiner* — Richard M Rump
(74) *Attorney, Agent, or Firm* — Kagan Binder, PLLC

(57) ABSTRACT

A high voltage lithium nickel cobalt manganese oxide precursor is provided in the present disclosure. Primary particles of the lithium nickel cobalt manganese oxide precursor are in a clustered "petals" configuration. The "petal" has a sheet shape. A secondary particle of the lithium nickel cobalt manganese oxide precursor has a spherical structure with a loosened interior. A method for making the high voltage lithium nickel cobalt manganese oxide precursor is further provided in the present disclosure. In the method, through the unique design of the reaction atmosphere in combination with advantages of high-low pH phase separation as well as the appropriate matching between the output power and flow rates, the lithium nickel (Continued)

cobalt manganese oxide precursor having "petal-like" and sheet shaped primary particles and spherical and porous secondary particles is made. Compared to the conventional precursor, the primary particle of the present precursor has a unique structure and the secondary particle of the present precursor has a loosened and porous interior, which provide an important guiding significance for a morphology study of small particle sized lithium nickel cobalt manganese oxide precursor and a preparation process optimization. A high voltage lithium nickel cobalt manganese oxide cathode material made from the nickel cobalt manganese oxide precursor has a single-crystal structure.

17 Claims, 12 Drawing Sheets

(58) Field of Classification Search
CPC .............. C01P 2006/11; C01P 2006/80; C01P 2004/32; C01P 2004/20; C01P 2004/51; C01P 2004/62; C01P 2004/64; C01P 2004/03; C01P 2004/45; C01P 2006/12; C01P 2006/40; H01M 2004/028; H01M 4/525; H01M 4/505; H01M 10/052; Y02E 60/10
See application file for complete search history.

(56) References Cited

FOREIGN PATENT DOCUMENTS

| | | | |
|---|---|---|---|
| CN | 106006762 A | | 10/2016 |
| CN | 106745331 A | * | 5/2017 |
| CN | 106745336 A1 | | 5/2017 |
| CN | 106892464 A | | 6/2017 |
| CN | 107565125 A | | 1/2018 |
| EP | 3272711 A1 | | 1/2018 |
| JP | 2016138024 A | * | 8/2016 |
| KR | 20150065046 A | * | 6/2015 |
| KR | 101593401 B1 | * | 2/2016 ............. H01M 4/36 |

OTHER PUBLICATIONS

English machine translation of CN106745331A (Year: 2017).*
English machine translation of KR20150065046A (Year: 2015).*
English machine translation of KR101593401B1 (Year: 2016).*
International Search Report, and English Translation thereof, for International Application No. PCT/CN2018/084678, dated Jul. 19, 2018 (5 pages).
Extended European Search Report for European Application No. 18847728.5, dated May 27, 2021, (8 pages).
Korean Office Action for Korean Application No. 9-5-2021-084429422, dated Oct. 27, 2021, (9 pages).

* cited by examiner

HIGH VOLTAGE LITHIUM NICKEL COBALT MANGANESE OXIDE PRECURSOR, METHOD FOR MAKING THE SAME, AND HIGH VOLTAGE LITHIUM NICKEL COBALT MANGANESE OXIDE CATHODE MATERIAL

TECHNICAL FIELD

The present disclosure belongs to the field of lithium ion battery material and in particular relates to a high voltage lithium nickel cobalt manganese oxide precursor having a special morphology, a method for making the same, and a high voltage lithium nickel cobalt manganese oxide cathode material.

BACKGROUND

A lithium ion battery, which is regarded as a novel and green battery by the battery industry, has been widely used in various fields, such as the digital field, the electric vehicle field, the energy storage field, and so on, due to its advantages of no memory effect, high specific energy, long cycle life, etc. Excellent performance of the lithium ion battery is based on manufacture of advanced battery material. The performance of a cathode material, such as the commonly used lithium cobalt oxide, lithium manganese oxide, lithium iron phosphate, and so on, has a great influence on the battery performance. A ternary material has characteristics such as high discharge capacity, long cycle life, etc., so that a usage share of the ternary material in the lithium ion battery cathode materials is gradually increasing. In recent years, a requirement for energy density of the lithium ion battery grows with the development of electric vehicles. To increase a battery life of the electric vehicle, developing a power battery with a high energy density is an urgent task. A lithium nickel cobalt manganese oxide material with characteristics of high voltage platform, high discharge capacity, and so on, has received extensive attentions and researches in the lithium ion battery industry and scientific community. Different types of battery materials can be obtained corresponding to different nickel, cobalt, and manganese ratios of the ternary materials. The higher the nickel content, the higher the discharge capacity. Therefore, developing the ternary material with the high discharge capacity and the long cycle life becomes a consensus in the lithium ion battery industry. The discharge capacity per gram of the ternary material can be increased with the increase of the nickel content in the ternary material or a charging voltage of the ternary material. With the increase of the nickel content, the discharge capacity of the ternary material gradually increases, but a cycle performance of the ternary material gradually deteriorates as well. Therefore, developing a high voltage ternary material with a medium nickel content is an inevitable choice for increasing the energy density of the ternary material. The commonly used ternary material on the market is spherical secondary particles aggregated from primary particles. However, for the ternary material with such morphology, the secondary particle is easily to be broken during the electrode plate rolling process. Moreover, the secondary particle is likely to have a crack during the charge-discharge cycling processes of the battery. Consequently, the battery tends to have a poor safety performance and a short cycle life. The above shortcomings can be avoided by using a single-crystal ternary material which consists of large-sized primary particles with almost no secondary aggregation. Since there is no space in the single particle, it is less likely to generate gas in the charge-discharge processes of the battery, so the single-crystal ternary material has a higher safety.

The single-crystal ternary material can be made by sintering a ternary material precursor with lithium carbonate in a certain sintering protocol. Therefore, the development of the high performance single-crystal ternary material depends greatly on the preparation of a high performance precursor. For example, a patent application with a publication number CN103746111A discloses a method for making a single-crystal nickel cobalt manganese cathode material, in which a method for making a single-crystal cathode material precursor is disclosed. However, this method is not suitable for the industrial production. A patent application with a publication number CN103840151A provides a method for making a ternary material with a special single-crystal structure, in which a salt solution including nickel sulfate, cobalt sulfate, and manganese sulfate is used, a pH value is regulated by an ammonia solution, and a reaction kettle is placed in a muffle furnace and heated at a high temperature. Although such method is unique, there is a risk in the manufacture technique of this application. The heating of the reaction kettle in the muffle furnace has a huge potential safety hazard, and is impracticable for the industrial production. A patent application with a publication number CN104979546A discloses a composition and a particle size of a primary particle of a single-crystal precursor and a BET range of the precursor. However, in this patent application, the BET is greater than 100 $m^2/g$, whereas BET of lithium carbonate is about 10 $m^2/g$. Due to such a great BET difference, the lithium carbonate is difficult to be mixed uniformly in the mixing process, the mixture tends to be fluffy, and less mixture can be loaded for the sintering, which results in a relatively low productivity and a relatively large amount of lithium residue in the sintering product. Besides, in this patent application, the valence state of the nickel element, the cobalt element, and the manganese element has to be +2, which limits an action of the manganese element with diverse valence states. A patent application with a publication number CN104201367A provides a method for making a small-particle precursor and a property analysis for the precursor. However, in this patent application, a precise filter pipe is used to control a solid content in a reaction kettle. The increase of the solid content in the reaction system under a constant flow rate and a constant stirring power will induce a serious aggregation phenomenon in secondary particles, and easily damage a crystalline form of the primary particles, not able to form uniform primary particles with sheet morphology. Moreover, the inventors have concluded from multiple experiments that due to the high solid content in the system the precursor obtained by the method disclosed in that patent application has relatively compact interior, and the primary particles mainly have a plate shape just like the morphology shown in the SEM photographs in that patent application. The obtaining of the precursor having sheet-shaped primary particles is closely related to an oxygen concentration of a reaction atmosphere as well as a stirring power and a flow rate. Therefore, there is a great practical significance in deepening the research on the property and the preparation process of the single-crystal ternary precursor.

SUMMARY

The technical problem to be solved by the present disclosure is to provide a high voltage lithium nickel cobalt manganese oxide precursor having a special morphology, a method for making the same, and a high voltage lithium nickel cobalt manganese oxide cathode material to overcome the shortcomings and defects as described in the above background.

To solve the above technical problem, the present disclosure provides technical solutions as follows.

A high voltage lithium nickel cobalt manganese oxide precursor is provided. The high voltage lithium nickel cobalt manganese oxide precursor includes secondary particles. Each secondary particle is composed of primary particles. The primary particles of the lithium nickel cobalt manganese oxide precursor are petals in a clustered configuration. The petal has a sheet shape. The secondary particle of the lithium nickel cobalt manganese oxide precursor has a spherical structure with a loosened interior. The secondary particle of the lithium nickel cobalt manganese oxide precursor has a porous internal structure.

In an embodiment, the sheet shaped petal has a length of 400 nm to 800 nm and a thickness of 50 nm to 100 nm.

In an embodiment, particle sizes of the secondary particles are as follows: D10 is not smaller than 1.5 μm, D50 is from 3 μm to 4 μm, and D90 is not greater than 8 μm; and the secondary particles have a particle size distribution of (D90−D10)/D50<1.

In an embodiment, the lithium nickel cobalt manganese oxide precursor has a molecule formula of $Ni_xCo_yMn_z(OH)_2$, wherein x+y+z=1, 0.5≤x≤0.9, 0<y≤0.2, and 0<z≤0.2. Ni and Co are both in a valence state of +2 in the lithium nickel cobalt manganese oxide precursor. Mn is in mixed valence states of +2, +3, and +4 in the lithium nickel cobalt manganese oxide precursor. A change of the valence state of Mn element can vary the sintering process (lithium addition), thereby affecting the electrochemical performance of the battery.

In an embodiment, the lithium nickel cobalt manganese oxide precursor has a tap density of 1 to 1.5 $g/cm^3$, a specific surface area of 8 to 20 $m^2/g$, an apparent density of 0.6 to 1 $g/cm^3$, and a sulfur content of 0.12% to 0.7%.

The primary particles of the precursor of the present disclosure are in the clustered "petals" configuration. The "petal" has a sheet shape. The "petal" has a length of 400 to 800 nm and a thickness of 50 to 100 nm. The length and the thickness of the primary particle have a certain correspondence with a BET value. By synthetically considering the unique design of the dimensions (the length and the thickness) of the primary particles, the particle size, and the BET, the precursor of the present disclosure is easier to be uniformly mixed with lithium carbonate, which facilitates an infiltration of the lithium salt in the sintering process.

As a single general inventive concept, a method for making a high voltage lithium nickel cobalt manganese oxide precursor is further provided in the present disclosure. The method includes steps of:

(1) preparing a soluble mixed salt water solution according to a stoichiometric ratio of $Ni_xCo_yMn_z(OH)_2$, a total concentration of metal ions in the solution is 1 to 2 mol/L, wherein the soluble mixed salt water solution is prepared by mixing nickel sulfate, cobalt sulfate, and manganese sulfate;

(2) adding an ammonia solution with a concentration of 2 to 6 g/L into a reaction kettle as a reaction base solution, and regulating a pH value of the reaction base solution to 12 to 13;

(3) introducing high purity nitrogen gas into the reaction kettle while starting a stirrer of the reaction kettle, feeding the soluble mixed salt water solution prepared in the step (1), a strong alkali solution, and an ammonia solution simultaneously into the reaction kettle to have a reaction, and maintaining the pH value of the reaction system between 12 and 13 throughout the whole reaction process of the step (3);

(4) terminating the feeding of the strong alkali solution and the introducing of the purity nitrogen gas, keeping the feeding of the soluble mixed salt water solution and the ammonia solution to reduce the pH value of the reaction system to 11 to 12 (for example, the pH value is controlled within the range from 11.8 to 11.9) to keep the reaction; and (5) obtaining a qualified material overflowed from the reaction kettle after the reaction (the reaction is finished when the target particle diameter D50 of 3 to 4 μm is achieved), thereby obtaining the high voltage lithium nickel cobalt manganese oxide precursor.

In the present disclosure, by designing the reaction atmosphere and filling the protective gas at an early stage of the reaction, a relatively well nanosheet can be formed at the beginning. Besides, an aggregation degree of the hexagonal nanosheets is controlled by different precipitation processes, so as to control an aggregation form of the sheets.

In an embodiment, in the step (2), an ammonia concentration in the reaction base solution is 2 to 4 g/L and the pH value of the reaction base solution is 12.5 to 12.6.

In an embodiment, in the step (3), the ammonia solution has a concentration of 10 to 13 mol/L; and the strong alkali solution is a sodium hydroxide solution with a concentration of 6 to 8 mol/L.

In an embodiment, in the step (3), the high purity nitrogen gas is nitrogen gas with a purity of 99.999%; a stirring frequency of the stirrer is 40 to 50 Hz; a feed flow rate of the soluble mixed salt water solution is 2 to 4 L/h; a feed flow rate of the ammonia solution is 0.4 to 0.8 L/h; an ammonia concentration in the reaction system is kept 4 to 6 throughout the whole reaction process of the step (3); a reaction temperature is 30° C. to 40° C., for example, 35° C. to 40° C. The feeding of the strong alkali solution and the introducing of the high purity nitrogen gas are terminated after 2 to 3 hours continuous feeding in the step (3).

In an embodiment the reaction is continuously carried out in the step (4) for at least 20 hours.

In an embodiment, the unqualified material (a slurry with D50<the target diameter) obtained after the reaction is pumped circularly into the reaction kettle as seed crystals for the next production.

In an embodiment, the step (5) further includes ageing, filtering under pressure, washing, drying, and sieving the qualified material overflowed from the reaction kettle.

In an embodiment, in the step (5), the washing process comprises: firstly adding the material in a sodium hydroxide solution with a concentration of 6 to 8 mol/L to wash, the temperature for the washing is 60° C. to 70° C.; and then adding the material into pure water to wash, until a pH value of the used water is smaller than 10 (for example, pH<9.5). The drying comprises: drying the material at 110° C. until a water content of the material is not greater than 1%. The sieving comprises: sieving the material by using a 325 mesh sieve.

As a single general inventive concept, a high voltage lithium nickel cobalt manganese oxide cathode material is further provided in the present disclosure. The high voltage lithium nickel cobalt manganese oxide cathode material is obtained by sintering the lithium nickel cobalt manganese oxide precursor as described above or made by the method as described above with a lithium salt in an oxygen atmosphere at a temperature of 700° C. to 930° C., wherein the high voltage lithium nickel cobalt manganese oxide cathode material has a single-crystal structure.

The present disclose has the following advantages as compared to the prior art:

(1) In the high voltage lithium nickel cobalt manganese oxide precursor of the present disclosure, the primary particles are "petals" and have the sheet shape. An oriented alignment of the primary particles allows the secondary particle to be spherical and porous. By sintering the precursor with the special structure under a certain condition, a single-crystal ternary material with more uniform primary particles is obtained. Such material has higher cycle and rate performances.

(2) The method of the present disclosure adopts the reaction activity of the manganese element combined with the unique design of the reaction atmosphere to achieve the precursor with a large BET, a loosened interior, and sheet shaped primary particles. By appropriately matching the output power with the reaction flow rates, the secondary particles have a good dispersing performance, and no aggregation phenomenon occurs among the secondary particles.

(3) The lithium nickel cobalt manganese oxide precursor of the present disclosure has primary particles with special structures and shapes, and secondary particles or aggregations thereof, so that the sintering process, requiring a lower sintering temperature, is more advantageous than a conventional sintering process.

(4) In the method of the present disclosure, through the unique design of the reaction atmosphere in combination with advantages of high-low pH phase separation as well as the appropriate matching between the output power and the flow rates, the lithium nickel cobalt manganese oxide precursor having "petal-like" and sheet shaped primary particles and spherical and porous secondary particles is made. Compared to the conventional precursor, the primary particle of the present precursor has a unique structure and the secondary particle of the present precursor has a loosened and porous interior, which provide an important guiding significance for a morphology study of small particle sized lithium nickel cobalt manganese oxide precursor and a preparation process optimization.

DETAILED DESCRIPTION

A more comprehensive and detailed description with reference to the drawings and preferred embodiments will be made below to better understand the present disclosure. However, the protection scope of the present disclosure is not limited to the specific embodiments below.

Unless expressly defined otherwise, all the terms used herein should be interpreted to have the same meaning as those commonly understood by the person skilled in the art. The terms used herein is merely to describe the specific embodiments of the present disclosure, and is not intended to limit the scope of the present disclosure.

Unless expressly specified otherwise, various raw materials, reagents, instruments, and apparatuses used herein are all commercially available or can be prepared by existing methods

EXAMPLE 1

Figure 1:
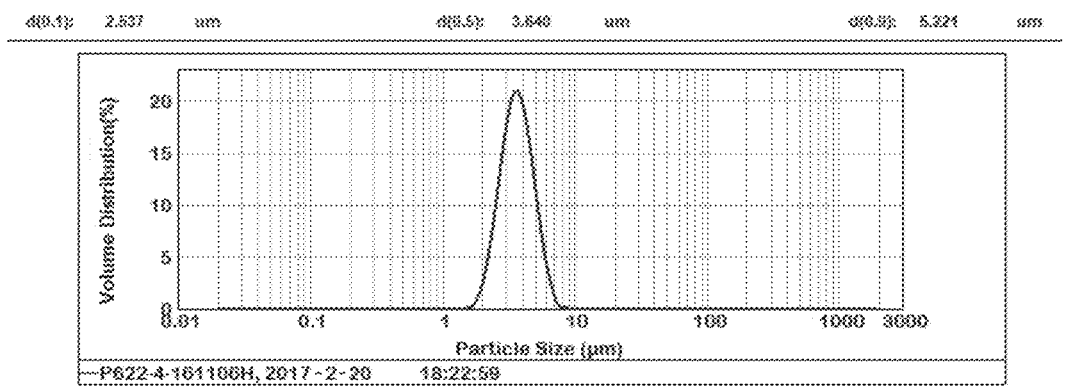
FIG. 1 is a particle size distribution diagram of $Ni_{0.6}Co_{0.2}Mn_{0.2}(OH)_2$ particles made in Example 1 of the present disclosure.
Figure 2:
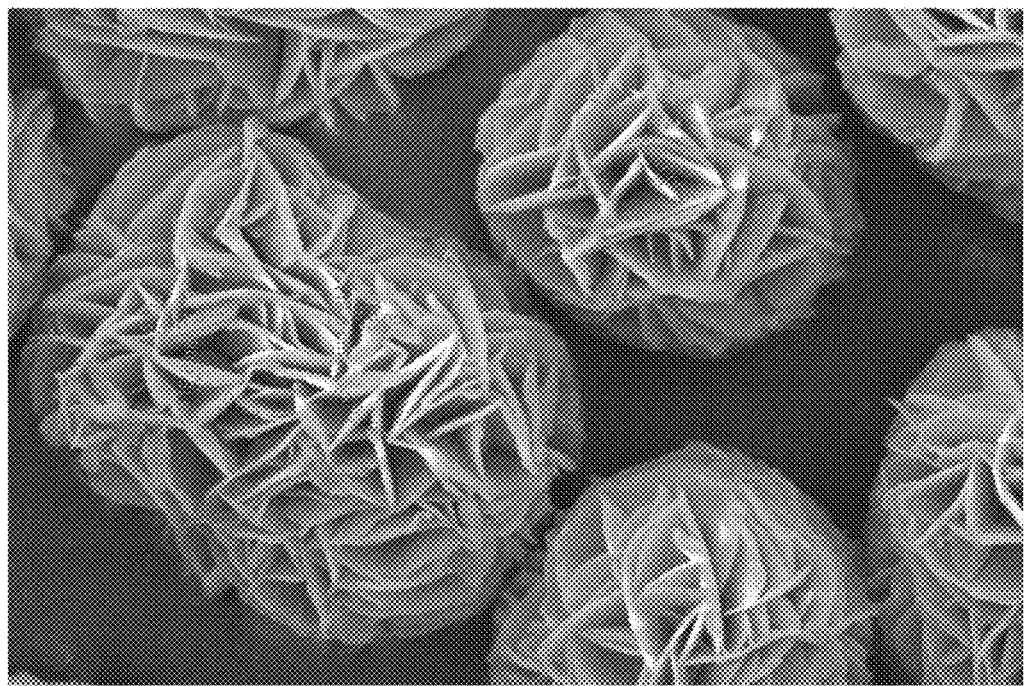
FIG. 2 is an image of the $Ni_{0.6}Co_{0.2}Mn_{0.2}(OH)_2$ particles made in Example 1 of the present disclosure observed under 50000-times electron microscope.
Figure 3:
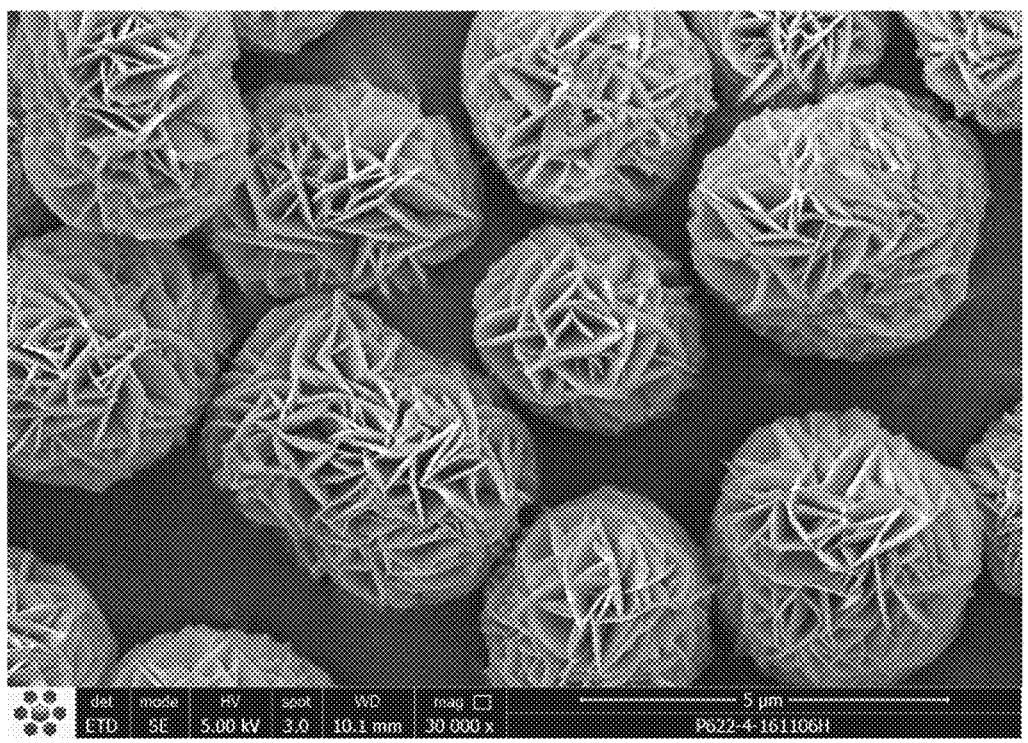
FIG. 3 is an image of the $Ni_{0.6}Co_{0.2}Mn_{0.2}(OH)_2$ particles made in Example 1 of the present disclosure observed under 30000-times electron microscope.
Figure 4:
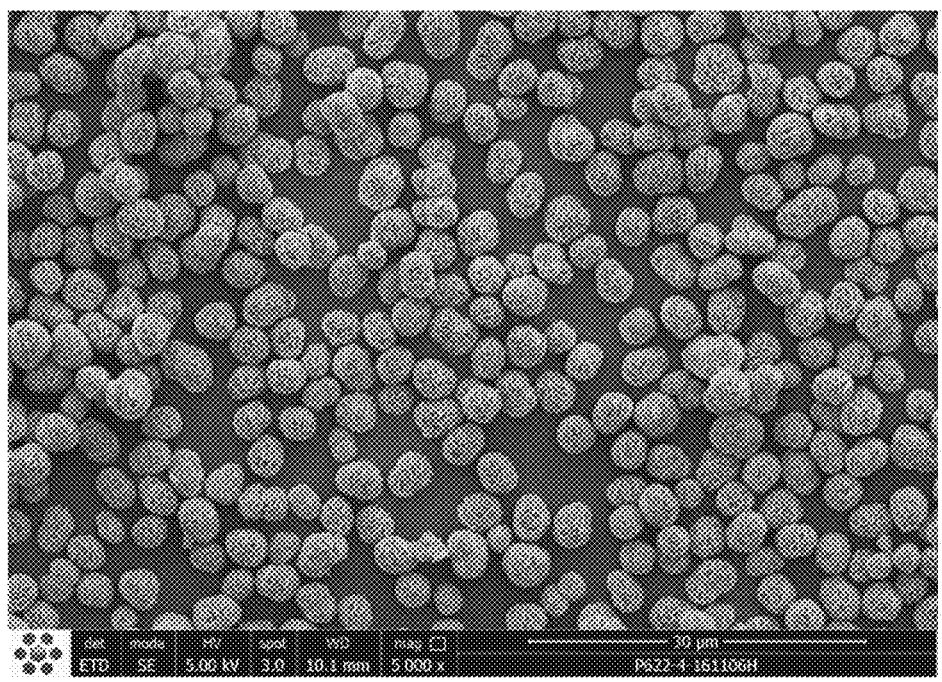
FIG. 4 is an image of the $Ni_{0.2}Co_{0.2}Mn_{0.2}(OH)_2$ particles made in Example 1 of the present disclosure observed under 5000-times electron microscope.

A high voltage lithium nickel cobalt manganese oxide precursor, with a molecular formula of $Ni_{0.6}Co_{0.2}Mn_{0.2}(OH)_7$, is provided in the present disclosure. In the lithium nickel cobalt manganese oxide precursor, Ni and Co are both in a valence state of +2, and Mn is in a mixed valence state of +2, +3, and +4. Primary particles of the lithium nickel cobalt manganese oxide precursor are in a clustered "petals" configuration. The "petal" has a sheet shape. The primary particle sheet (i.e. the sheet shaped petal) has a length of about 500 nm and a thickness of about 80 nm (see FIG. 2). A secondary particle has a spherical structure with a loosened interior (see FIGS. 2-4). It can be seen from the microscopic inner structure that the primary particle has a petaloid shape; and the interior of the secondary structure is loosened and porous. Particle sizes of the secondary particles are as follows: D10=2.537 μm, D50=3.640 μm, and D90=5.221 μm (see FIG. 1). A particle size distribution of the secondary particles satisfies (D90−D10)/D50<1. The high voltage lithium nickel cobalt manganese oxide precursor has a tap density of 1.18 g/cm$^3$, a specific surface area of 9.37 m$^2$/g, an apparent density of 0.79 g/cm$^3$, and a sulfur content of 0.18%.

The method for making the high voltage lithium nickel cobalt manganese oxide precursor in the present example includes the following steps:

(1) preparing a soluble metal mixed salt water solution from nickel sulfate, cobalt sulfate, and manganese sulfate according to a molar ratio of metal elements in the chemical formula $Ni_{0.6}Co_{0.2}Mn_{0.2}(OH)_2$, a total concentration of metal ions in the solution is 1.5 mol/L;

and preparing a sodium hydroxide solution with a concentration of 8 mol/L and an ammonia solution with a concentration of 10 mol/L;

(2) adding an ammonia solution with a concentration of 10 mol/L into a 50 L reaction kettle as a base solution of the reaction kettle, controlling the concentration of the ammonia solution in the reaction kettle base solution to be 3.5 g/L, and then pumping a sodium hydroxide solution with a concentration of 8 mol/L into the reaction kettle by a peristaltic pump to regulate a pH value of the reaction kettle base solution to 12.6; and having a stirring paddle of a stirrer of the reaction kettle immersed by the reaction kettle base solution;

(3) introducing high purity nitrogen gas with a concentration of 99.999% into the reaction kettle after the step (2) while starting the stirrer of the reaction kettle, a stirring revolution speed of the stirrer is set to 50 Hz;

(4) feeding the soluble metal mixed salt water solution, the sodium hydroxide solution, and the ammonia solution prepared in the step (1) into the reaction kettle in parallel flows by peristaltic pumps, stirring and reacting; throughout the reaction under stirring, a temperature in the reaction kettle is controlled to be 40° C., a feed flow rate of the soluble metal mixed salt water solution is controlled to be 1.8 L/h, and a feed flow rate of the ammonia solution is controlled to be 0.5 L/h; a pH value of the reaction system is controlled to be 12.6 throughout the reaction by controlling a feed flow rate of the sodium hydroxide solution;

(5) feeding continuously for 3 hours, then reducing the flow rate of the alkali pump to zero while closing an inlet of the nitrogen gas to reduce the pH value of the reaction system to 11.9, keeping feeding the soluble metal mixed salt water solution and the ammonia solution to keep the reaction (a reaction time is 2.0 hours); increasing an ammonia content of the reaction system through the ammonia pump to 4.5 g/L; measuring sizes of particles in the slurry once every 2 hours by a laser particle size analyzer in the reaction process during which fine particles produced in the reaction are gradually grown, and sphericity of the fine particles are gradually improved with the continuous feeding during the reaction; collecting qualified material when it is detected that the particle sizes of secondary particles or aggregations in the reaction kettle reach the target particle sizes: D50=3 to 4 μm; having the qualified material overflowed into an ageing kettle to age the qualified material, and reserving the unqualified material as seed crystals to be used in the next production (next high voltage lithium nickel cobalt manganese oxide precursor production);

(6) removing an upper clear liquid after ageing for 2.5 hours; filtering under pressure by using a plate-frame press machine after the ageing is terminated, and adding a sodium hydroxide solution with a concentration of 6 mol/L to wash the material with alkaline, and controlling a temperature of the washing liquid to be 60° C. to 70° C.;

(7) after the alkaline wash, washing the material with pure water until a pH value of the used water is smaller than 9.5, then drying the washed material at 110° C., and sieving the dried material by using a 325 mesh sieve, thereby obtaining the high voltage lithium nickel cobalt manganese oxide precursor;

(8) mixing lithium carbonate with the lithium nickel cobalt manganese oxide precursor in a molar ratio of 1.05:1 uniformly in a high speed mixer, and sintering the mixture in an oxygen atmosphere at a temperature of 930° C. for 12 hours, thereby obtaining a lithium nickel cobalt manganese oxide cathode material.

Figure 5:
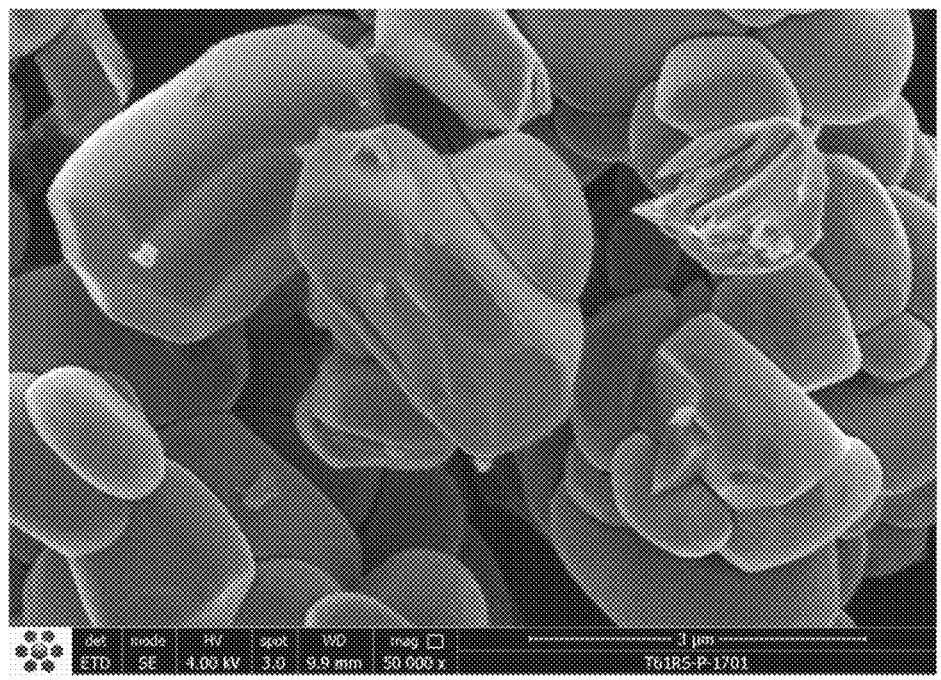
FIG. 5 is an image showing a morphology of a lithium nickel cobalt manganese oxide cathode material made in Example 1 of the present disclosure.

FIG. 5 shows a morphology of the lithium nickel cobalt manganese oxide cathode material. The lithium nickel cobalt manganese oxide cathode material has a single-crystal structure. A battery is made by using the lithium nickel cobalt manganese oxide cathode material. An electrochemical performance of the battery is shown in Table 1.

COMPARATIVE EXAMPLE 1

A high voltage lithium nickel cobalt manganese oxide precursor in the present comparative example was made by a method including the following steps:

(1) preparing a soluble metal mixed salt water solution according to a molar ratio of metal elements in the chemical formula of $Ni_{0.6}Co_{0.2}Mn_{0.2}(OH)_2$, a total concentration of metal ions in the solution is 1.5 mol/L; and preparing a sodium hydroxide solution with a concentration of 8 mol/L and an ammonia solution with a concentration of 10 mol/L;

(2) adding an ammonia solution into a 50 L reaction kettle as a base solution of the reaction kettle, controlling the concentration of the ammonia solution in the reaction kettle base solution to be 3.5 g/L, and then pumping a sodium hydroxide solution with a concentration of 8 mol/L into the reaction kettle by a peristaltic pump to regulate a pH value of the reaction kettle base solution to be 12.6; and having a stirring paddle of a stirrer of the reaction kettle immersed by the reaction kettle base solution;

(3) introducing 99.999% nitrogen gas into the reaction kettle after the step 2) while starting the stirrer of the reaction kettle, a stirring revolution speed of the stirrer is set to 50 Hz;

(4) feeding the soluble metal mixed salt water solution, the sodium hydroxide solution, and the ammonia solution prepared in the step (1) into the reaction kettle in parallel flows by peristaltic pumps, stirring and reacting; throughout the reaction under stirring, a temperature in the reaction kettle is controlled to be 40° C., a feed flow rate of the soluble metal mixed salt water solution is controlled to be 1.8 L/h, and a feed flow rate of the ammonia solution is controlled to be 0.3 L/h; a pH value of the reaction system is controlled to be 11.9 throughout the reaction by controlling a feed flow rate of the sodium hydroxide solution;

(5) measuring sizes of particles in the slurry once every 2 hours by a laser particle size analyzer in the reaction process during which fine particles produced in the reaction are gradually grown, and sphericity of the fine particles are gradually improved with the continuous feeding during the reaction; collecting qualified material when it is detected that the particle sizes of secondary particles or aggregations in the reaction kettle reach the target particle sizes: D50=3 to 4 μm; having the qualified material overflowed into an ageing kettle to age the qualified material, and reserving the unqualified material as seed crystals to be used in the next production;

(6) removing an upper clear liquid after ageing for 2.5 hours; filtering under pressure by using a plate-frame press machine after the ageing is terminated, and adding a sodium hydroxide solution with a concentration of 6 mol/L to wash the material with alkaline, while controlling a temperature of the washing liquid to be 60° C. to 70° C.;

(7) after the alkaline wash, washing the material with pure water until a pH value of the used water is smaller than 9.5, then drying the washed material at 110° C., and sieving the dried material by using a 325 mesh sieve, thereby obtaining $Ni_{0.6}Co_{0.2}Mn_{0.2}(OH)_7$ of the present comparative example;

(8) mixing lithium carbonate with the lithium nickel cobalt manganese oxide precursor in a molar ratio of 1.05:1 uniformly in a high speed mixer, and sintering the mixture in an oxygen atmosphere at a temperature of 950° C. for 12 hours, thereby obtaining a lithium nickel cobalt manganese oxide cathode material.

Figure 6:
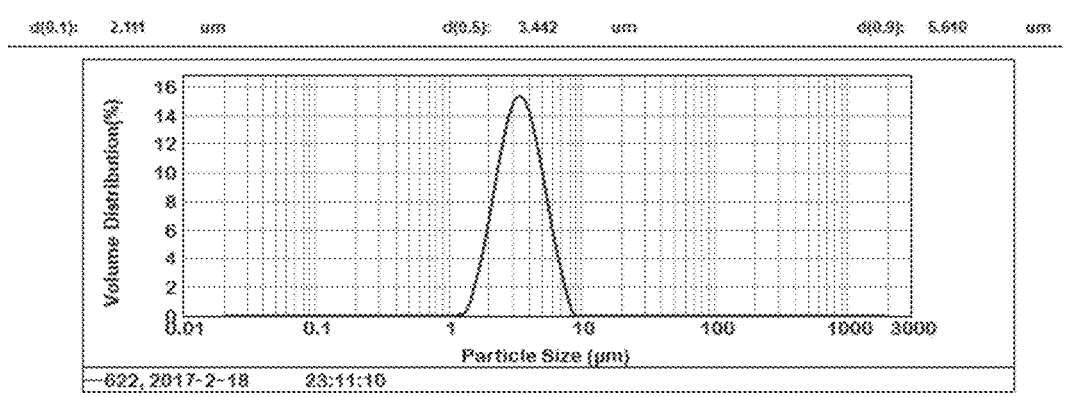
FIG. 6 is a particle size distribution diagram of $Ni_{0.6}Co_{0.2}Mn_{0.2}(OH)_2$ particles made in Comparative Example 1 of the present disclosure.
Figure 7:
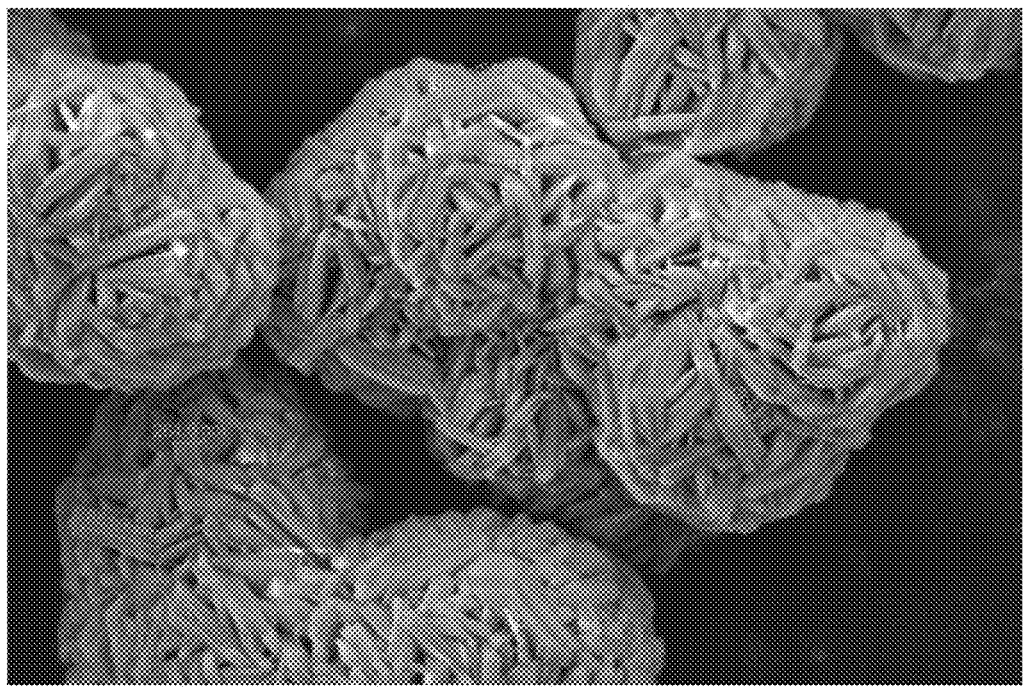
FIG. 7 is an image of the $Ni_{0.6}Co_{0.2}Mn_{0.2}(OH)_2$ particles made in Comparative Example 1 of the present disclosure observed under 50000-times electron microscope.
Figure 8:
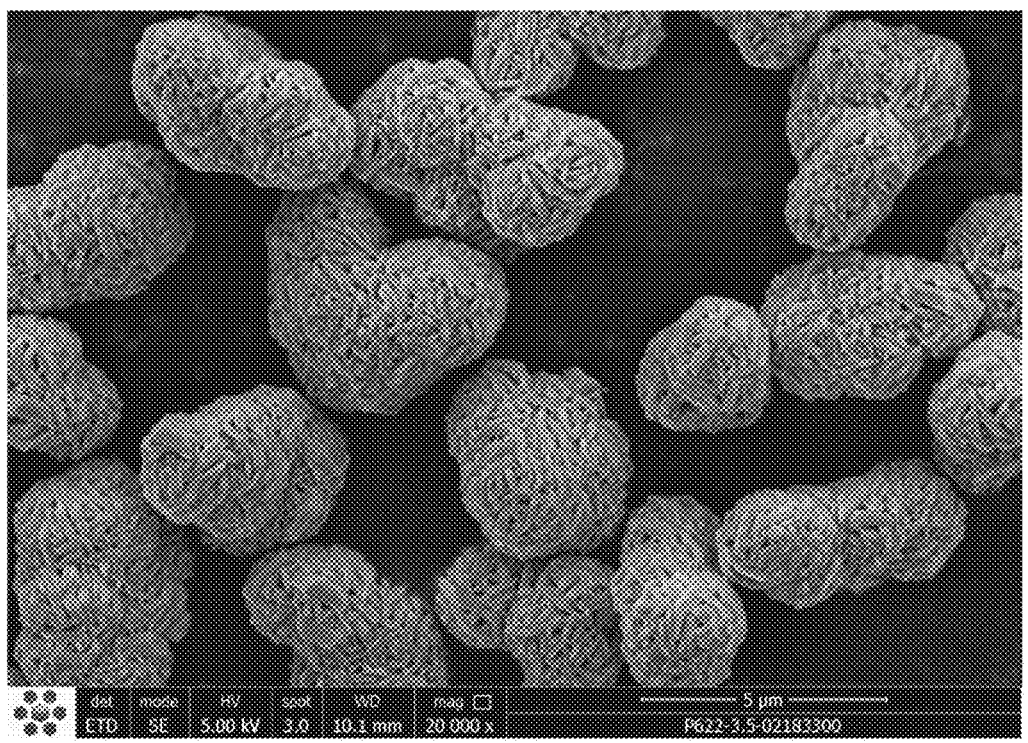
FIG. 8 is an image of the $Ni_{0.6}Co_{0.2}Mn_{0.2}(OH)_2$ particles made in Comparative Example 1 of the present disclosure observed under 20000-times electron microscope.
Figure 9:
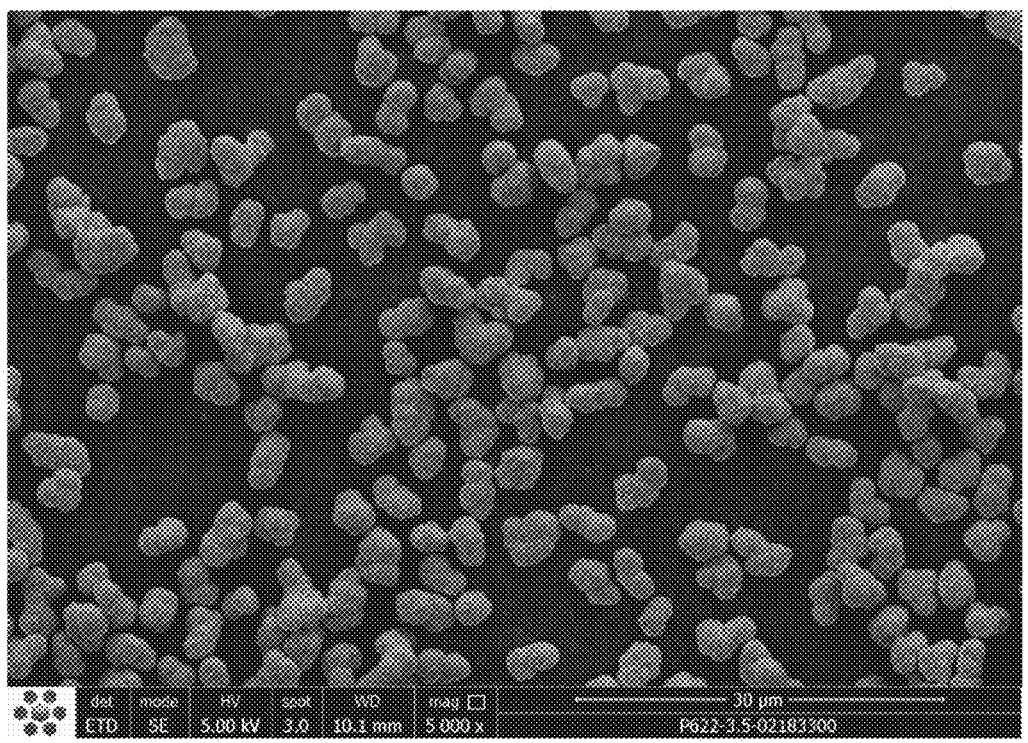
FIG. 9 is an image of the $Ni_{0.6}Co_{0.2}Mn_{0.2}(OH)_2$ particles made in Comparative Example 1 of the present disclosure observed under 5000-times electron microscope.

FIG. 6 shows a particle size distribution of $Ni_{0.6}Co_{0.2}Mn_{0.2}(OH)_2$ made in the present comparative example. The primary particles have an average particle size of 600 nm and a thickness of 200 nm. D10=2.111 μm, D50=3.442 μm, and D90=5.610 μm. A tap density is 1.56 g/cm³. An apparent density is 1.2 g/cm³. A sulfur content is 0.16%. A specific surface area is 5.6 m²/g. FIGS. 7-9 are electron microscope photographs of $Ni_{0.6}Co_{0.2}Mn_{0.2}(OH)_2$ made in the present comparative example. As shown in FIGS. 7-9, the primary particles of the precursor have a plate shape, and the secondary particles of the precursor having bumps are seriously aggregated.

Figure 10:
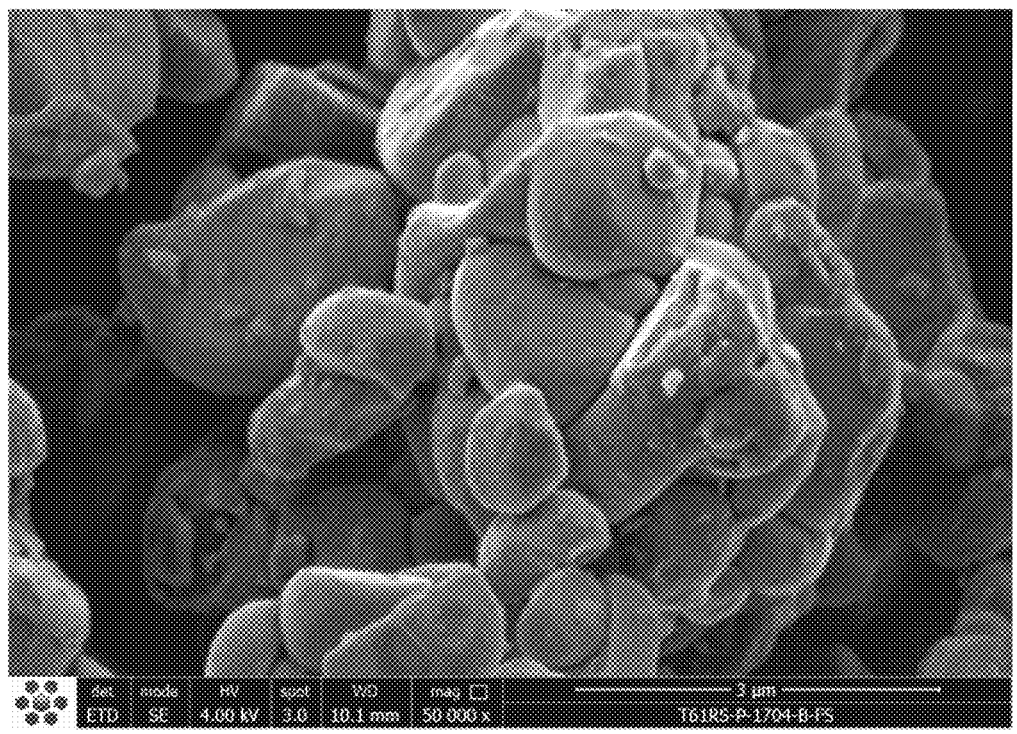
FIG. 10 is an image showing a morphology of a lithium nickel cobalt manganese oxide cathode material made in Comparative Example 1 of the present disclosure.

FIG. 10 shows a morphology of the lithium nickel cobalt manganese oxide cathode material made in the present comparative example. A battery is made by using the lithium nickel cobalt manganese oxide cathode material. An electrochemical performance of the battery is shown in Table 1.

EXAMPLE 2

Figure 11:
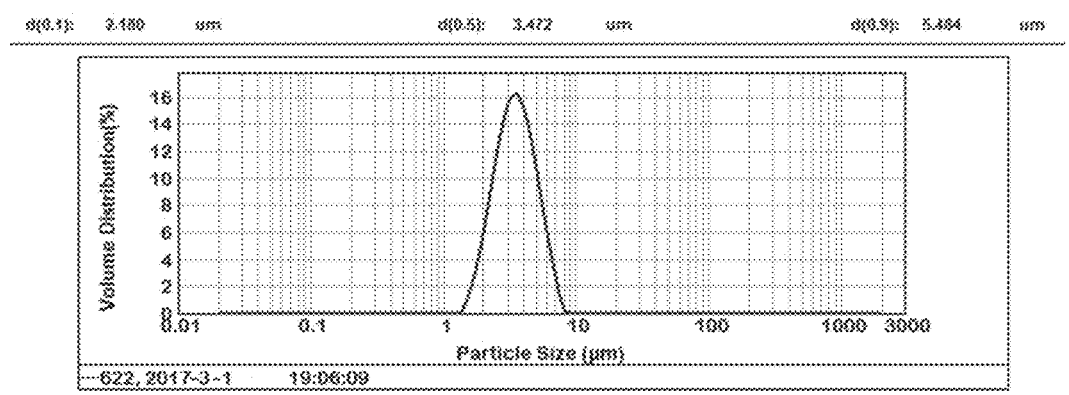
FIG. 11 is a particle size distribution diagram of $Ni_{0.6}Co_{0.2}Mn_{0.2}(OH)_2$ particles made in Example 2 of the present disclosure.
Figure 12:
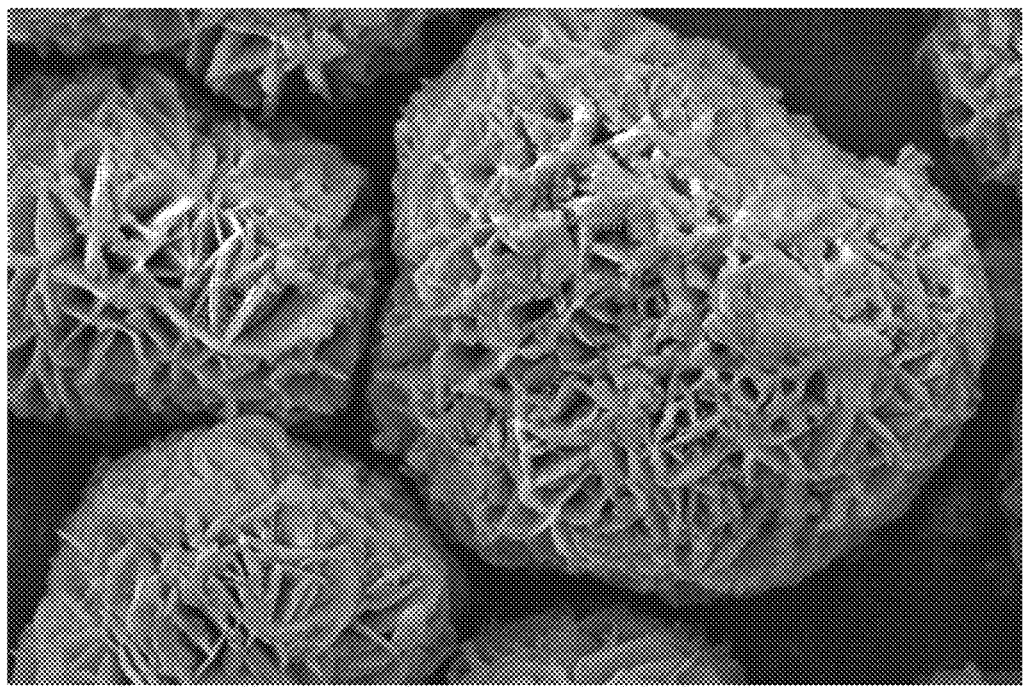
FIG. 12 is an image of the $Ni_{0.6}Co_{0.2}Mn_{0.2}(OH)_2$ particles made in Example 2 of the present disclosure observed under 50000-times electron microscope.
Figure 13:
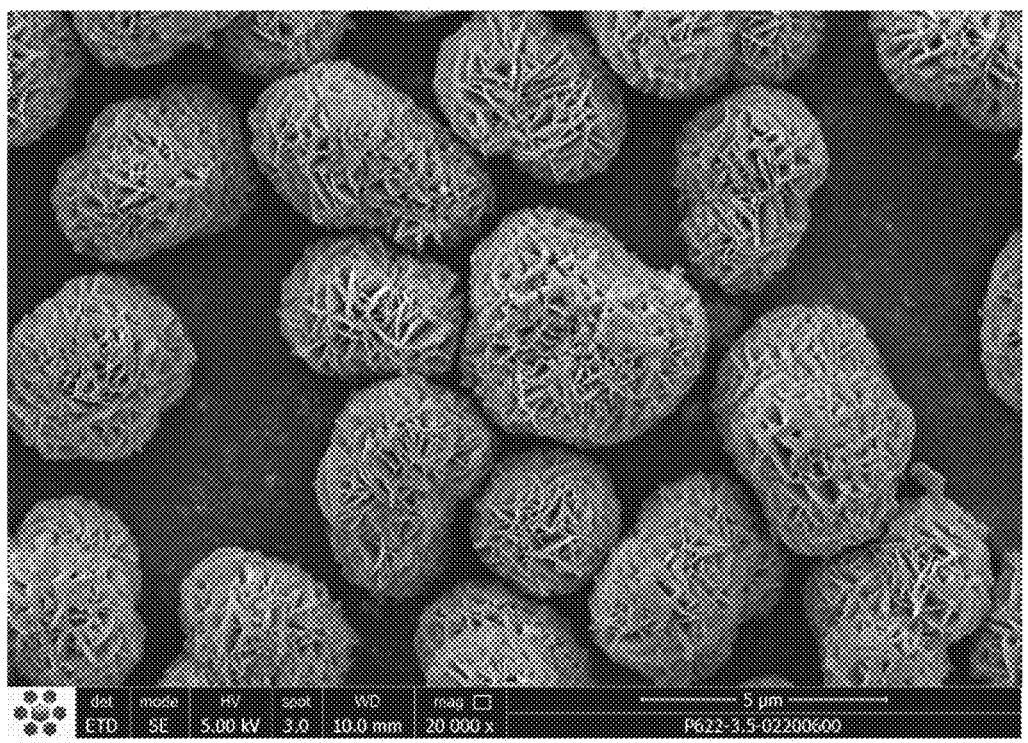
FIG. 13 is an image of the $Ni_{0.6}Co_{0.2}Mn_{0.2}(OH)_2$ particles made in Example 2 of the present disclosure observed under 20000-times electron microscope.
Figure 14:
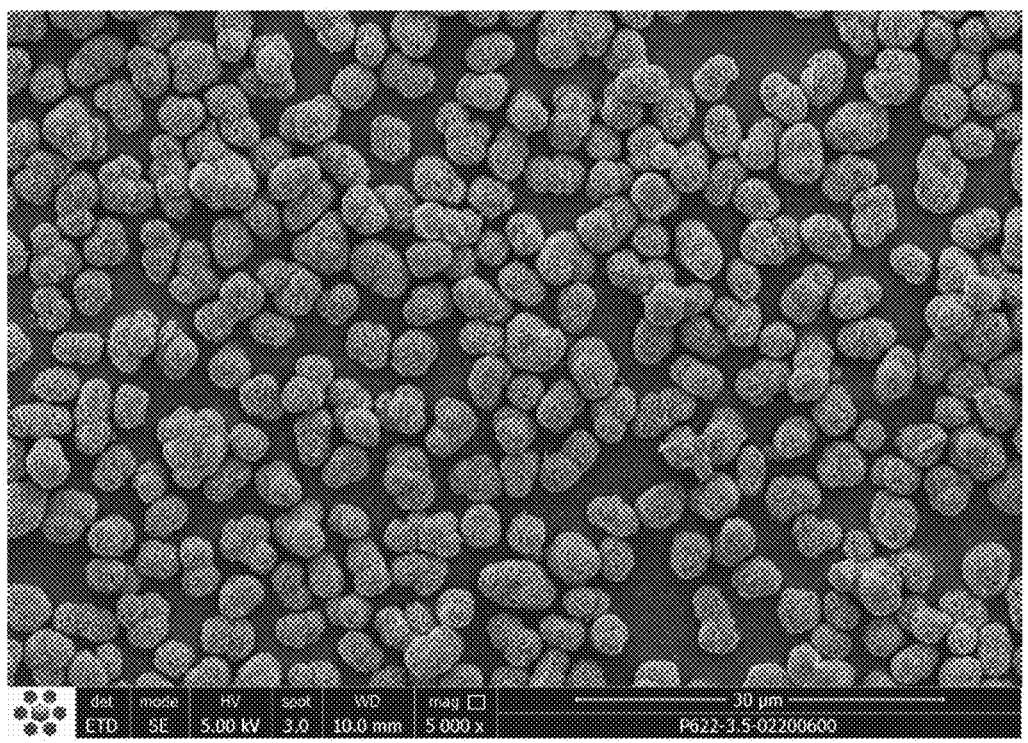
FIG. 14 is an image of the $Ni_{0.6}Co_{0.2}Mn_{0.2}(OH)_2$ particles made in Example 2 of the present disclosure observed under 5000-times electron microscope.

A high voltage lithium nickel cobalt manganese oxide precursor, with a molecular formula of $Ni_{0.6}Co_{0.2}Mn_{0.2}(OH)_2$, is provided in the present disclosure. In the lithium nickel cobalt manganese oxide precursor, Ni and Co are both in a valence state of +2, and Mn is in a mixed valence state of +2, +3, and +4. Primary particles of the lithium nickel cobalt manganese oxide precursor are in a clustered "petals" configuration. The "petal" has a sheet shape. Primary particle sheet has a length of 400 nm and a thickness of 100 nm (see FIG. 12). A secondary particle has a spherical structure with a loosened interior. It can be seen from the microscopic inner structure that the primary particle has a petaloid shape; and the secondary particle has a loosened and porous interior (see FIGS. 12-14). Particle sizes of the secondary particles are as follows: D10=2.180 μm, D50=3.472 μm, and D90=5.848 μm (see FIG. 11). A particle size distribution of the secondary particles satisfies (D90–D10)/D50<1. The high voltage lithium nickel cobalt manganese oxide precursor has a tap density of 1.15 g/cm³, a specific surface area of 12.69 m²/g, an apparent density of 0.9 g/cm³, and a sulfur content of 0.17%.

The method for making the high voltage lithium nickel cobalt manganese oxide precursor in the present example includes the following steps:

(1) preparing a soluble metal mixed salt water solution from nickel sulfate, cobalt sulfate, and manganese sulfate according to a molar ratio of metal elements in the chemical formula $Ni_{0.6}Co_{0.2}Mn_{0.2}(OH)_2$, a metal ion total concentration of 1.8 mol/L;

and preparing a sodium hydroxide solution with a concentration of 6 mol/L and an ammonia solution with a concentration of 10 mol/L;

(2) adding an ammonia solution with a concentration of 10 mol/L into a 50 L reaction kettle as a base solution of the reaction kettle, controlling the concentration of the ammonia solution in the reaction kettle base solution to be 3 g/L, and then pumping a sodium hydroxide solution with a concentration of 6 mol/L into the reaction kettle by a peristaltic pump to regulate a pH value of the reaction kettle base solution to be 12.5; and having a stirring paddle of a stirrer of the reaction kettle immersed by the reaction kettle base solution;

(3) introducing high purity nitrogen gas with a purity of 99.999% into the reaction kettle after the step (2), while starting the stirrer of the reaction kettle, a stirring revolution speed of the stirrer is set to 50 Hz;

(4) feeding the soluble metal mixed salt water solution, the sodium hydroxide solution, and the ammonia solution prepared in the step (1) into the reaction kettle in parallel flows by peristaltic pumps, stirring and reacting; throughout the reaction under stirring, a temperature in the reaction kettle is controlled to be 40° C., a feed flow rate of the soluble metal mixed salt water solution is controlled to be 2 L/h, and a feed flow rate of the ammonia solution is controlled to be 0.6 L/h; a pH value of the reaction system is controlled to be 12.5 throughout the reaction;

(5) feeding continuously for 3 hours, then reducing the flow rate of the alkali pump to zero while closing an inlet of the nitrogen gas to reduce the pH value of the reaction system to 11.8, increasing an ammonia content of the reaction system through the ammonia pump to 4 g/L; measuring sizes of particles in the slurry once every 2 hours by a laser particle size analyzer in the reaction process during which fine particles produced in the reaction are gradually grown, and sphericity of the fine particles are gradually improved with the continuous feeding during the reaction; collecting qualified material when it is detected that the particle sizes of secondary particles or aggregations in the reaction kettle reach target particle sizes: D50=3 to 4 μm (reacting for 16 to 18 hours); having the qualified material overflowed into an ageing kettle to age the qualified material, and reserving the unqualified material as seed crystals to be used in the next production;

(6) removing an upper clear liquid after ageing for 2.5 hours; filtering under pressure by using a plate-frame press machine after the ageing is terminated, and adding a sodium hydroxide solution with a concentration of 6 mol/L to wash the material with alkaline, and controlling a temperature of the washing liquid to be 60° C. to 70° C.;

(7) after the alkaline wash, washing the material with pure water until a pH value of the used water is smaller than 9.5, then drying the washed material at 110° C., and sieving the dried material by using a 325 mesh sieve, thereby obtaining the high voltage lithium nickel cobalt manganese oxide precursor;

(8) mixing lithium carbonate with the lithium nickel cobalt manganese oxide precursor in a molar ratio of 1.05:1 uniformly in a high speed mixer, and sintering the mixture in an oxygen atmosphere at a temperature of 930° C. for 12 hours, thereby obtaining a lithium nickel cobalt manganese oxide cathode material.

Figure 15:
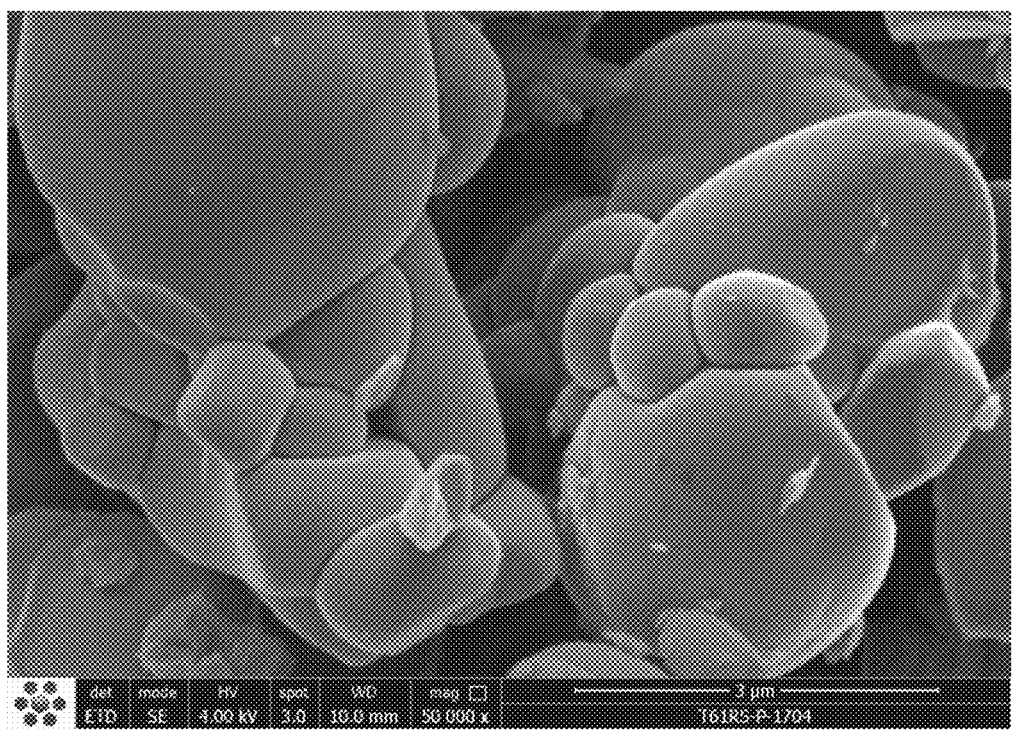
FIG. 15 is an image showing a morphology of a lithium nickel cobalt manganese oxide cathode material made in Example 2 of the present disclosure.

FIG. 15 shows a morphology of the lithium nickel cobalt manganese oxide cathode material. The lithium nickel cobalt manganese oxide cathode material has a single-crystal structure. battery is made by using the lithium nickel cobalt manganese oxide cathode material. An electrochemical performance of the battery is shown in Table 1.

TABLE 1 electrochemical performances of batteries made
from lithium nickel cobalt manganese
oxides of examples and comparative example

| | first discharge capacity mAh/g (discharge at 0.2 C. at normal temperature, voltage range: 3-4.35 V) | rate capability (2 C./ 0.2 C.) % | capacity retention % after 50 cycles (charging and discharge at 1 C.) |
|---|---|---|---|
| Example 1 | 182 | 94 | 95 |
| Example 2 | 180 | 93.8 | 94 |
| Comparative example 1 | 175 | 92 | 91 |

What is claimed is:

1. A lithium nickel cobalt manganese oxide precursor, comprising secondary particles, wherein each secondary particle is composed of primary particles, the primary particles of the lithium nickel cobalt manganese oxide precursor are petals in a clustered configuration, the petal has a sheet shape, and the secondary particle of the lithium nickel cobalt manganese oxide precursor has a spherical structure with a loosened interior, wherein the lithium nickel cobalt manganese oxide precursor has a tap density of 1 to 1.5 g/cm$^3$, a specific surface area of 8 to 20 m$^2$/g, an apparent density of 0.6 to 1 g/cm$^3$, and a sulfur content of 0.12% to 0.2%.

2. The lithium nickel cobalt manganese oxide precursor of claim 1, wherein the sheet shaped petal has a length of 400 nm to 800 nm and a thickness of 50 nm to 100 nm.

3. The lithium nickel cobalt manganese oxide precursor of claim 1, wherein particle sizes of the secondary particles are as follows: D10 is not smaller than 1.5 μm D50 is from 3 μm to 4 μm, and D90 is not greater than 8 μm; and the secondary particles have a particle size distribution of (D90−D10)/D50<1.

4. The lithium nickel cobalt manganese oxide precursor of claim 1, wherein the lithium nickel cobalt manganese oxide precursor has a molecular formula of $Ni_xCo_yMn_z(OH)_2$, x+y+z=1, 0.5≤x≤0.9, 0<y≤0.2, and 0<z≤0.2, Ni and Co are both in a valence state of +2 in the lithium nickel cobalt manganese oxide precursor, and Mn is in mixed valence states of +2, +3, and +4 in the lithium nickel cobalt manganese oxide precursor.

5. A method for making the lithium nickel cobalt manganese oxide precursor of claim 1, comprising steps of:
(1) preparing a soluble mixed salt water solution according to a stoichiometric ratio of $Ni_xCo_yMn_z(OH)_2$, a total concentration of metal ions in the solution is 1 to 2 mol/L, wherein x+y+z=1, 0.5≤x≤0.9, 0<y≤0.2, and 0<z≤0.2;
(2) adding an ammonia solution into a reaction kettle as a reaction base solution, controlling an ammonia concentration in the reaction base solution to be 2 to 6 g/L, and regulating a pH value of the reaction base solution to 12 to 13;
(3) introducing high purity nitrogen gas into the reaction kettle while starting a stirrer of the reaction kettle, feeding the soluble mixed salt water solution prepared in the step (1), a strong alkali solution, and an ammonia solution simultaneously into the reaction kettle to have a reaction, and maintaining a pH value of the reaction system between 12 and 13 throughout whole reaction process of the step (3);
(4) terminating the feeding of the strong alkali solution and the introducing of the high purity nitrogen gas, keeping the feeding of the soluble mixed salt water solution and the ammonia solution to reduce the pH value of the reaction system to 11 to 12 to keep the reaction; and
(5) obtaining a qualified material overflowed from the reaction kettle after the reaction, thereby obtaining the lithium nickel cobalt manganese oxide precursor.

6. The method of claim 5, wherein in the step (3), the ammonia solution has a concentration of 10 to 13 mol/L, and the strong alkali solution is a sodium hydroxide solution with a concentration of 6 to 8 mol/L.

7. The method of claim 5, wherein in the step (3), the high purity nitrogen gas is nitrogen gas with a purity of 99.999%; a stirring frequency of the stirrer is 40 to 50 Hz; a feed flow rate of the soluble mixed salt water solution is 1.5 to 4 L/h; a feed flow rate of the ammonia solution is 0.4 to 0.8 L/h, and the ammonia concentration in the reaction system is kept 4 to 6 g/L throughout the whole reaction process of the step (3); a reaction temperature is 30° C. to 40° C.; the feeding of the strong alkali solution and the introducing of the high purity nitrogen gas are terminated after feeding continuously for 2 to 3 hours in the step (3).

8. The method of claim 5, wherein the reaction is continuously carried out in the step (4) for at least 20 hours.

9. The method of claim 5, wherein the step (5) further comprises ageing, filtering under pressure, washing, drying, and sieving the qualified material overflowed from the reaction kettle.

10. The method of claim 9, wherein in the step (5), the washing process comprises: firstly adding the material in a sodium hydroxide solution with a concentration of 6 to 8 mol/L to wash, keeping a temperature for the washing to be 60° C. to 70° C., and then adding the material into pure water to wash, until a pH value of the used water is smaller than 10; and the drying comprises: drying the material at 110° C. until a water content of the material is not greater than 1%; the sieving comprises: sieving the material by using a 325 mesh sieve.

11. The method of claim 10, wherein the washing is terminated when the pH value of the used water is smaller than 9.5.

12. The method of claim 5, wherein in the step (2), the ammonia concentration in the reaction base solution is 2 to 4 g/L, and the pH value of the reaction base solution is 12.5 to 12.6.

13. The method of claim 5, wherein in the step (4), the pH value of the reaction system is controlled within the range from 11.8 to 11.9.

14. The method of claim 5, wherein in the step (5), the qualified material comprises a target particle diameter D50 of 3 to 4 μm.

15. A method for making a lithium nickel cobalt manganese oxide precursor, comprising steps of:
(1) preparing a soluble mixed salt water solution according to a stoichiometric ratio of $Ni_xCo_yMn_z(OH)_2$, a total concentration of metal ions in the solution is 1 to 2 mol/L, wherein x+y+z=1, 0.5≤x≤0.9, 0<y≤0.2, and 0<z≤0.2;
(2) adding an ammonia solution into a reaction kettle as a reaction base solution, controlling an ammonia concentration in the reaction base solution to be 2 to 6 g/L, and regulating a pH value of the reaction base solution to 12 to 13;
(3) introducing high purity nitrogen gas into the reaction kettle while starting a stirrer of the reaction kettle, feeding the soluble mixed salt water solution prepared in the step (1), a strong alkali solution, and an ammonia solution simultaneously into the reaction kettle to have a reaction, and maintaining a pH value of the reaction system between 12 and 13 throughout whole reaction process of the step (3), wherein in the step (3), the high purity nitrogen gas is nitrogen gas with a purity of 99.999%; a stirring frequency of the stirrer is 40 to 50 Hz; a feed flow rate of the soluble mixed salt water solution is 1.5 to 4 L/h; a feed flow rate of the ammonia solution is 0.4 to 0.8 L/h, and the ammonia concentration in the reaction system is kept 4 to 6 g/L throughout the whole reaction process of the step (3); a reaction temperature is 30° C. to 40° C.; the feeding of the strong alkali solution and the introducing of the high purity nitrogen gas are terminated after feeding continuously for 2 to 3 hours in the step (3);

(4) terminating the feeding of the strong alkali solution and the introducing of the high purity nitrogen gas, keeping the feeding of the soluble mixed salt water solution and the ammonia solution to reduce the pH value of the reaction system to 11 to 12 to keep the reaction; and (5) obtaining a qualified material overflowed from the reaction kettle after the reaction, thereby obtaining a lithium nickel cobalt manganese oxide precursor comprising secondary particles, wherein each secondary particle is composed of primary particles, the primary particles of the lithium nickel cobalt manganese oxide precursor are petals in a clustered configuration, the petal has a sheet shape, and the secondary particle of the lithium nickel cobalt manganese oxide precursor has a spherical structure with a loosened interior.

16. A method for making a lithium nickel cobalt manganese oxide precursor, comprising steps of:

(1) preparing a soluble mixed salt water solution according to a stoichiometric ratio of $Ni_xCo_yMn_z(OH)_2$, a total concentration of metal ions in the solution is 1 to 2 mol/L, wherein x+y+z=1, $0.5 \leq x \leq 0.9$, $0 < y \leq 0.2$, and $0 < z \leq 0.2$;

(2) adding an ammonia solution into a reaction kettle as a reaction base solution, controlling an ammonia concentration in the reaction base solution to be 2 to 6 g/L, and regulating a pH value of the reaction base solution to 12 to 13;

(3) introducing high purity nitrogen gas into the reaction kettle while starting a stirrer of the reaction kettle, feeding the soluble mixed salt water solution prepared in the step (1), a strong alkali solution, and an ammonia solution simultaneously into the reaction kettle to have a reaction, and maintaining a pH value of the reaction system between 12 and 13 throughout whole reaction process of the step (3);

(4) terminating the feeding of the strong alkali solution and the introducing of the high purity nitrogen gas, keeping the feeding of the soluble mixed salt water solution and the ammonia solution to reduce the pH value of the reaction system to 11 to 12 to keep the reaction; and (5) obtaining a qualified material overflowed from the reaction kettle after the reaction, thereby obtaining a lithium nickel cobalt manganese oxide precursor, wherein the step (5) further comprises ageing, filtering under pressure, washing, drying, and sieving the qualified material overflowed from the reaction kettle, wherein in the step (5), the washing process comprises: firstly adding the material in a sodium hydroxide solution with a concentration of 6 to 8 mol/L to wash, keeping a temperature for the washing to be 60° C. to 70° C., and then adding the material into pure water to wash, until a pH value of the used water is smaller than 10; and the drying comprises: drying the material at 110° C. until a water content of the material is not greater than 1%; the sieving comprises: sieving the material by using a 325 mesh sieve, and wherein the lithium nickel cobalt manganese oxide precursor comprises secondary particles, wherein each secondary particle is composed of primary particles, the primary particles of the lithium nickel cobalt manganese oxide precursor are petals in a clustered configuration, the petal has a sheet shape, and the secondary particle of the lithium nickel cobalt manganese oxide precursor has a spherical structure with a loosened interior.

17. The method of claim 16, wherein the washing is terminated when the pH value of the used water is smaller than 9.5.

* * * * *